United States Patent
Zhu et al.

(10) Patent No.: US 10,782,164 B2
(45) Date of Patent: Sep. 22, 2020

(54) FLEXIBLE, SELF-ROLLED SUPERFICIAL FLOW SENSOR

(71) Applicant: University of Virginia Patent Foundation, Charlottesville, VA (US)

(72) Inventors: Jianzhong Zhu, Crozet, VA (US); Hilary Bart-Smith, Charlottesville, VA (US); Carl White, Richmond, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 6 days.

(21) Appl. No.: 15/774,635

(22) PCT Filed: Nov. 18, 2016

(86) PCT No.: PCT/US2016/062840
§ 371 (c)(1),
(2) Date: May 9, 2018

(87) PCT Pub. No.: WO2017/087839
PCT Pub. Date: May 26, 2017

(65) Prior Publication Data
US 2018/0356264 A1    Dec. 13, 2018

Related U.S. Application Data

(60) Provisional application No. 62/258,169, filed on Nov. 20, 2015.

(51) Int. Cl.
*G01F 1/28* (2006.01)
*G01F 1/32* (2006.01)
*G01B 7/16* (2006.01)

(52) U.S. Cl.
CPC ............ *G01F 1/28* (2013.01); *G01B 7/20* (2013.01); *G01F 1/3263* (2013.01)

(58) Field of Classification Search
None
See application file for complete search history.

(56) References Cited

U.S. PATENT DOCUMENTS

| | | |
|---|---|---|
| 2005/0021247 A1 | 1/2005 | Liu et al. |
| 2013/0283922 A1 | 10/2013 | Qualtieri et al. |
| 2014/0218020 A1 | 8/2014 | Zhou et al. |

FOREIGN PATENT DOCUMENTS

WO    WO 2014/107139 A1    7/2014

OTHER PUBLICATIONS

International Search Report and Written Opinion dated Mar. 13, 2017, in International Application No. PCT/US2016/002840 (11pgs.).

*Primary Examiner* — Harshad R Patel
(74) *Attorney, Agent, or Firm* — Finnegan, Henderson, Farabow, Garrett & Dunner LLP

(57) ABSTRACT

A superficial flow sensor is provided, which may comprise a substrate, and a thin film comprising a self-rolled portion, a stationary portion, and a free ribbon portion. According to some aspects of the present disclosure, the self-rolled portion may be configured to have a residual stress and to deform under external forces.

5 Claims, 9 Drawing Sheets

FLEXIBLE, SELF-ROLLED SUPERFICIAL FLOW SENSOR

CLAIM FOR PRIORITY

This application is a U.S. national phase entry of International Application No. PCT/US2016/062840, filed Nov. 18, 2016, which claims the benefit of priority of U.S. Provisional Patent Application No. 62/258,169, filed Nov. 20, 2015, to both of which this application claims the benefit of priority, and the entirety of the subject matter of both of which is incorporated herein by reference.

FIELD OF THE DISCLOSURE

The present disclosure relates to Micro-Electro-Mechanical Systems (MEMS) sensors and, more particularly, to superficial flow sensors.

BACKGROUND

Many commercially viable flow sensors that use mechanical technology are difficult to miniaturize. Flow sensors that use electrical or thermal technology are generally easy to miniaturize. However, flow sensors that use electrical or thermal technology are often difficult to mass produce due to high cost. Some applications of flow sensors that are adapted both for miniaturization and low-cost may include use in a bio-inspired underwater vehicle, use in autonomous underwater vehicle feedback control, use in unmanned aerial vehicle feedback control, use in underwater obstacle detection, use in wake measurement, etc.

Thus, it may be desirable to develop new flow sensors that combine the miniaturization of traditional electrical or thermal flow sensors and yet are easy to mass produce. The superficial flow sensor disclosed herein may be adapted both for miniaturization and mass production due to its low cost.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

According to a first aspect, a superficial flow sensor may include a multi-layered thin film and a substrate. According to some aspects, the multi-layered film may include a self-rolled portion, a stationary portion, and a free ribbon portion. According to a further aspect, the substrate may include silicon. The substrate may further include a layer of porous silicon that may adhere to the stationary portion and may further include a coating of silicon dioxide that may weakly adhere to the self-rolled portion.

According to another aspect, a superficial flow sensor may include a multi-layered thin film, a substrate, and a strain gauge circuit. According to some aspects, the sensor may further include one or more contact pads configured to connect to a signal amplifier circuit.

According to another aspect, a method for manufacturing the disclosed superficial flow sensor may include growing silicon oxide films on both sides of a silicon wafer, opening an adhesive region on the upper film using at least one of photolithography and silicon dioxide etching, forming a layer of porous silicon on the adhesive region, spin coating a first layer of polyimide on the upper layer of the wafer, heat curing the first polyimide layer, coating a layer of metal atop the first polyimide layer, spin coating a second layer of polyimide on the metal layer, heat curing the second polyimide layer, coating strain gauge elements atop the resultant structure, spin coating a third layer of polyimide on the strain gauge elements, dicing the silicon wafer into a plurality of dies and cutting a notch in each die, and releasing the free ribbon portion and the self-rolled portion of the resultant sensor.

Exemplary objects and advantages will be set forth in part in the description that follows, or may be learned by practice of the exemplary embodiments. It is to be understood that both the foregoing general description and the following detailed description are exemplary and explanatory only and are not restrictive of the invention, as claimed.

DETAILED DESCRIPTION

According to some embodiments, a superficial flow sensor may include a multi-layered thin film and a substrate. According to some embodiments, the multi-layered film may include a self-rolled portion, a stationary portion, and a free ribbon portion. According to some embodiments, the substrate may include silicon and may contain one or more adhesives. For example, the substrate may include a layer of porous silicon configured to adhere to the stationary portion and may further include a coating of silicon dioxide configured to weakly adhere to the self-rolled portion.

According to some embodiments, a superficial flow sensor may include a multi-layered thin film, a substrate, and a strain gauge circuit. According to some embodiments, the multi-layered film may include a self-rolled portion, a stationary portion, and a free ribbon portion. According to some embodiments, the sensor may be configured to connect to a signal amplifier circuit. For example, the sensor may include one or more contact pads configured to connect to a signal amplifier circuit.

According to some embodiments, a method for manufacturing the disclosed superficial flow sensor may include growing silicon oxide films on both sides of a silicon wafer, opening an adhesive region on the upper film using at least one of photolithography and silicon dioxide etching, forming a layer of porous silicon on the adhesive region, spin coating a first layer of polyimide on the upper layer of the wafer, heat curing the first polyimide layer, coating a layer of metal atop the first polyimide layer, spin coating a second layer of polyimide on the metal layer, heat curing the second polyimide layer, coating strain gauge elements atop the resultant structure, spin coating a third layer of polyimide on the strain gauge elements, dicing the silicon wafer into a plurality of dies and cutting a notch in each die, and releasing the free ribbon portion and the self-rolled portion of the resultant sensor.

Advantageously, the disclosed superficial flow sensor may be miniaturized yet still remain cost-effective for mass production. As a result, the disclosed flow sensor may be adapted for general commercial uses such as use in a bio-inspired underwater vehicle, use in autonomous underwater vehicle feedback control, use in unmanned aerial vehicle feedback control, use in underwater obstacle detection, use in wake measurement, etc.

The disclosed flow sensor, according to some embodiments, may output a voltage that scales linearly with respect to an external flow speed. As a result, measurement of an external flow speed may be easier than with flow sensors that scale exponentially, quadratically, cubically, etc.

Figure 1:
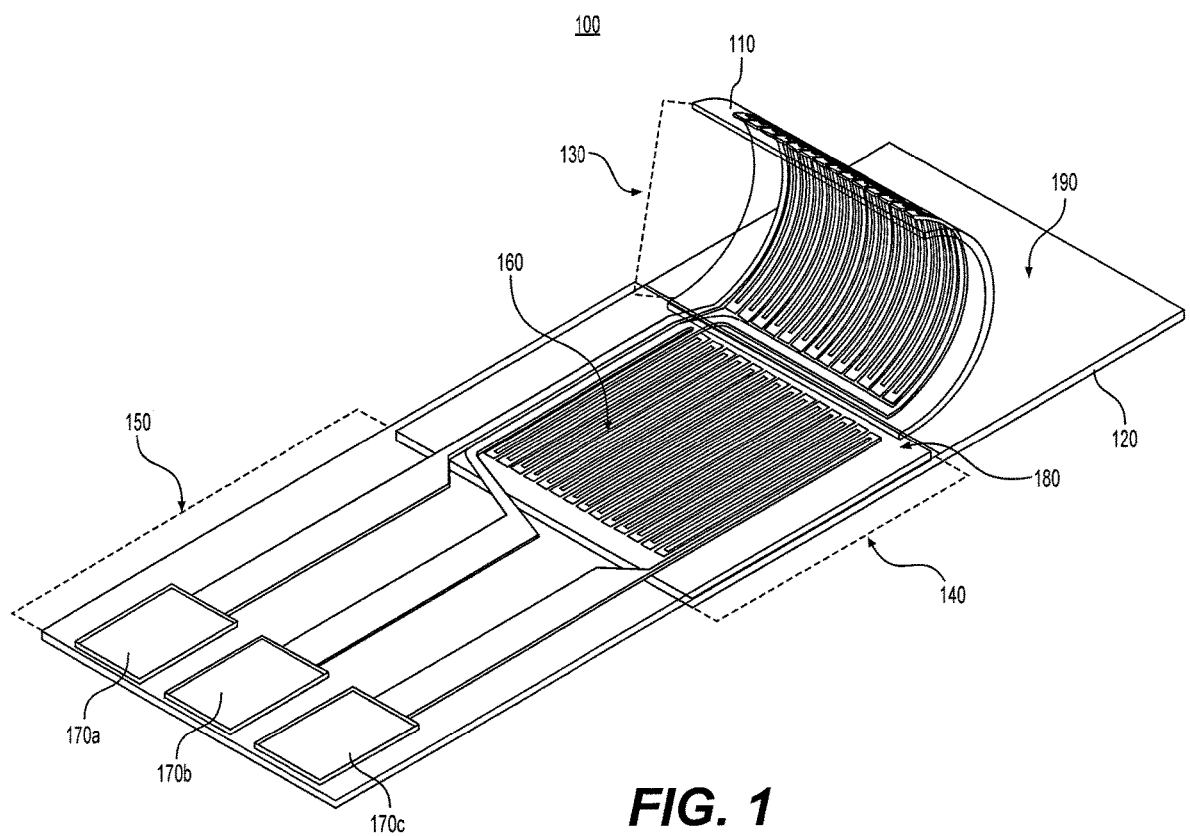
FIG. 1 is a schematic representation of an exemplary flow sensor, according to the present disclosure.

FIG. 1 is a schematic representation of exemplary flow sensor 100. Sensor 100 may include multi-layered thin film 110 and substrate 120. According to some embodiments, substrate 120 may include silicon.

According to some embodiments, film 110 may include self-rolled portion 130, stationary portion 140, and free ribbon portion 150. Film 110 may further include strain gauge circuit 160. According to some embodiments, circuit 160 may be embedded in film 110. According to some embodiments, circuit 160 may comprise a half quarter-bridge strain gauge circuit.

According to some embodiments, sensor 100 may further include one or more contact pads, e.g., pads 170a, 170b, and 170c. Preferably, the one or more contact pads may be configured to connect to a signal amplifier circuit (not shown).

According to some embodiments, sensor 100 may further include first adhesive layer 180. First adhesive layer 180 may reside between stationary portion 140 and substrate 120 and may be configured to bond stationary portion 140 to substrate 120. According to some embodiments, first adhesive layer 180 may include porous silicon.

According to some embodiments, sensor 100 may further include second adhesive layer 190. Second adhesive layer 190 may reside between self-rolled portion 130 and substrate 120 and may be configured to affect weak adhesion between self-rolled portion 130 and substrate 120. According to some embodiments, second adhesive layer 190 may include silicon dioxide.

As depicted in FIG. 1, self-rolled portion 130 exhibits residual stresses and mechanical property mismatch. Self-rolled portion 130 further deforms under external forces. For example, sensor 100 may be placed in a fluid, and self-rolled portion 130 may deform due to a flow within the fluid. Circuit 160 outputs a voltage in response to the deformation of self-rolled portion 130. Preferably, the output voltage scales linearly with the flow speed of an external fluid.

Figure 2:
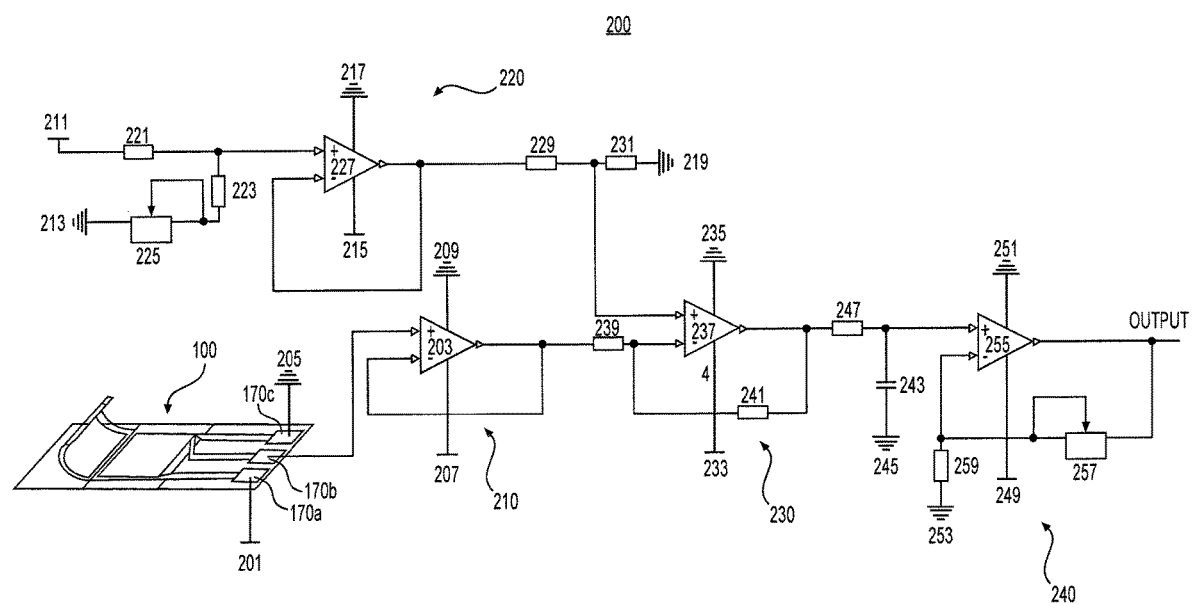
FIG. 2 is a schematic representation of an exemplary signal amplifier circuit, according to the present disclosure.

FIG. 2 is a schematic representation of signal amplifier circuit 200. According to some embodiments, contact pads 170a, 170b, and 170c of sensor 100 may be configured to connect to circuit 200. As depicted in FIG. 2, pad 170a may be connected to first voltage source 201, pad 170b may be connected to first operational amplifier 203, and pad 170c may be connected to first ground terminal 205. Operational amplifier 203 may be further connected to second voltage source 207 and second ground terminal 209. These elements connected to operational amplifier 203 may comprise a first amplification unit 210.

According to some embodiments, circuit 200 may further include third voltage source 211, third ground terminal 213, fourth voltage source 215, fourth ground terminal 217, and fifth ground terminal 219. Third voltage source 211 and third ground terminal 213 may be connected via first resistor 221, second resistor 223, and potentiometer 225. Third voltage source 211, fourth voltage source 215, and fourth ground terminal 217 may be connected via second operational amplifier 227. Fifth ground terminal 217 may be connected to operational amplifier 227 via third resistor 229 and fourth resistor 231. These elements connected to operational amplifier 227 may comprise a second amplification unit 220.

According to some embodiments, circuit 200 may further include fifth voltage source 233 and sixth ground terminal 235. Fifth voltage source 233, sixth ground terminal 235, and second amplification unit 220 may be connected to operational amplifier 237. First amplification unit 210 may also be connected to operational amplifier 237 via resistor 239. These elements connected to operational amplifier 237 may comprise a third amplification unit 230. Third amplification unit 230 may further include feedback resistor 241.

According to some embodiments, circuit 200 may further include capacitor 243 and seventh ground terminal 245. Capacitor 243 and seventh ground terminal 245 may be connected to third amplification unit 230 via resistor 247.

According to some embodiments, circuit 200 may further include sixth voltage source 249, eighth ground terminal 251, and ninth ground terminal 253. Sixth voltage source 249, eighth ground terminal 251, and ninth ground terminal 253 may be connected to operational amplifier 255. Third amplification unit 230 may also be connected to operational amplifier 255 via resistor 247. These elements connected to operational amplifier 255 may comprise a fourth amplification unit 240. Fourth amplification unit 240 may further include potentiometer 257 and feedback resistor 259.

As depicted in FIG. 2, the output voltage from sensor 100 is amplified by first amplification unit 210, which is powered by second voltage source 207. The output voltage is further amplified by third amplification unit 230, which is powered by fifth voltage source 233 and by second amplification unit 220. The output voltage is further amplified by fourth amplification unit 240, which is powered by sixth voltage source 249.

Figure 3:
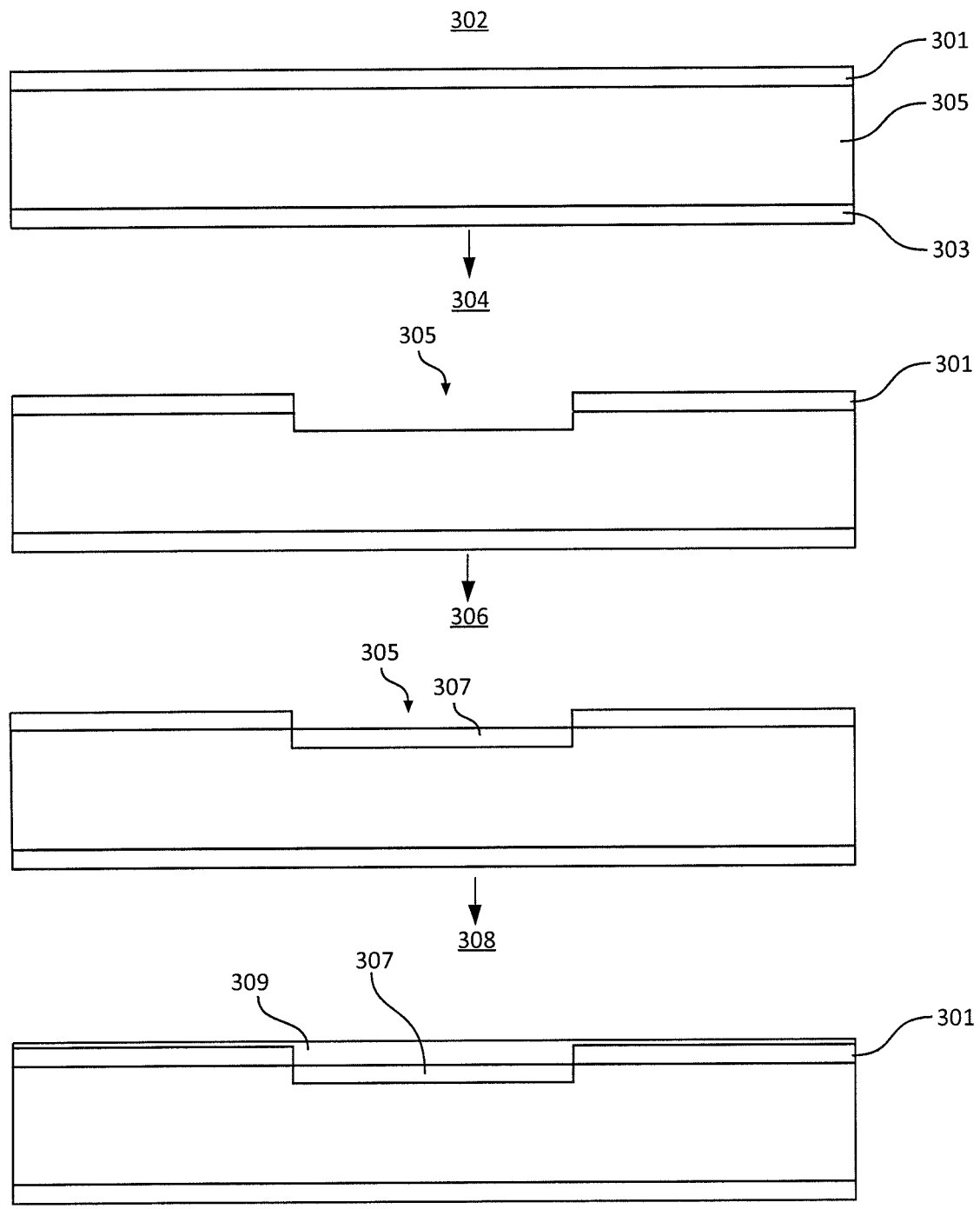
FIG. 3 is a flowchart of an exemplary method for manufacturing the exemplary flow sensor of FIG. 1, according to the present disclosure.
Figure 3:
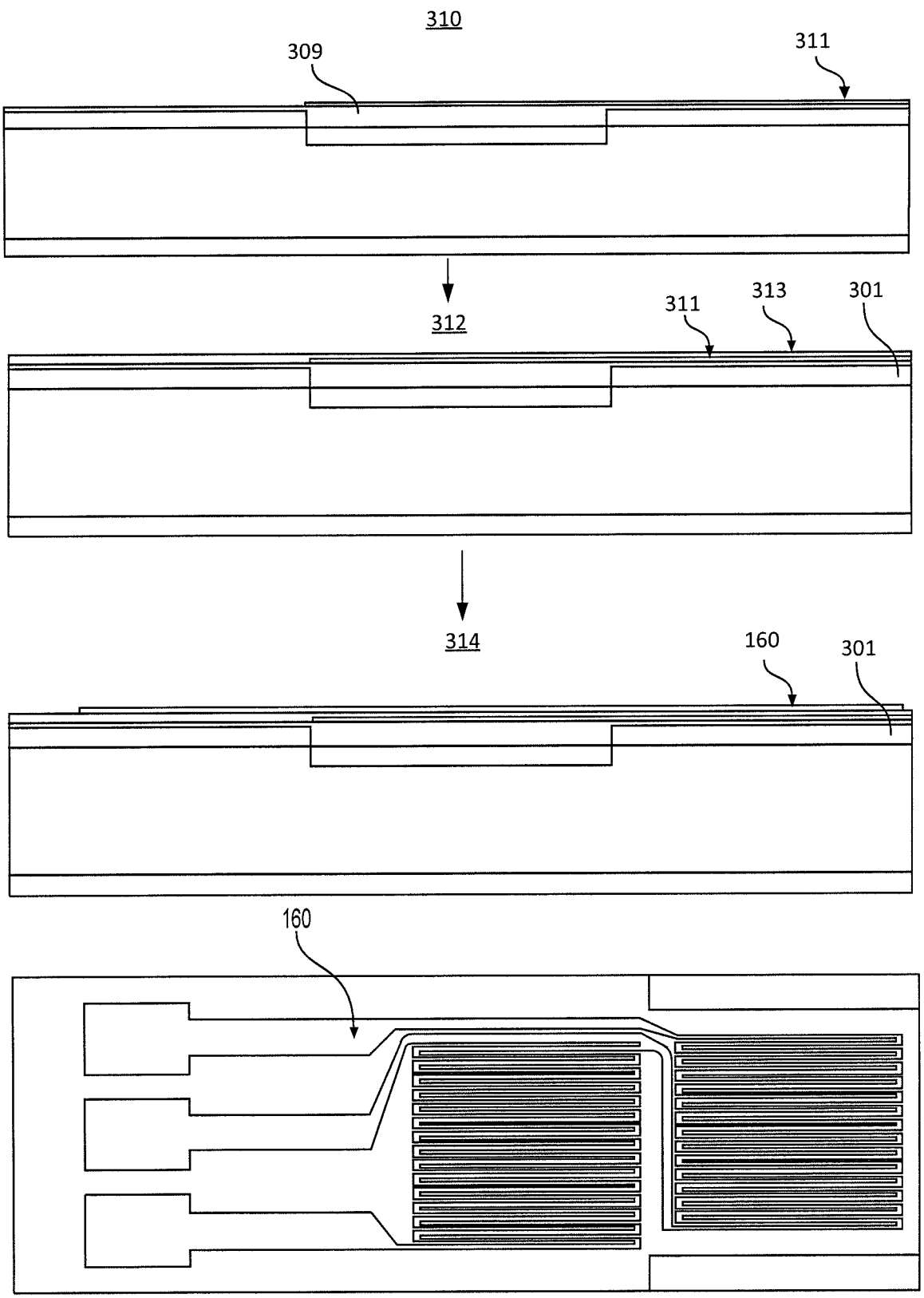
Figure 3:
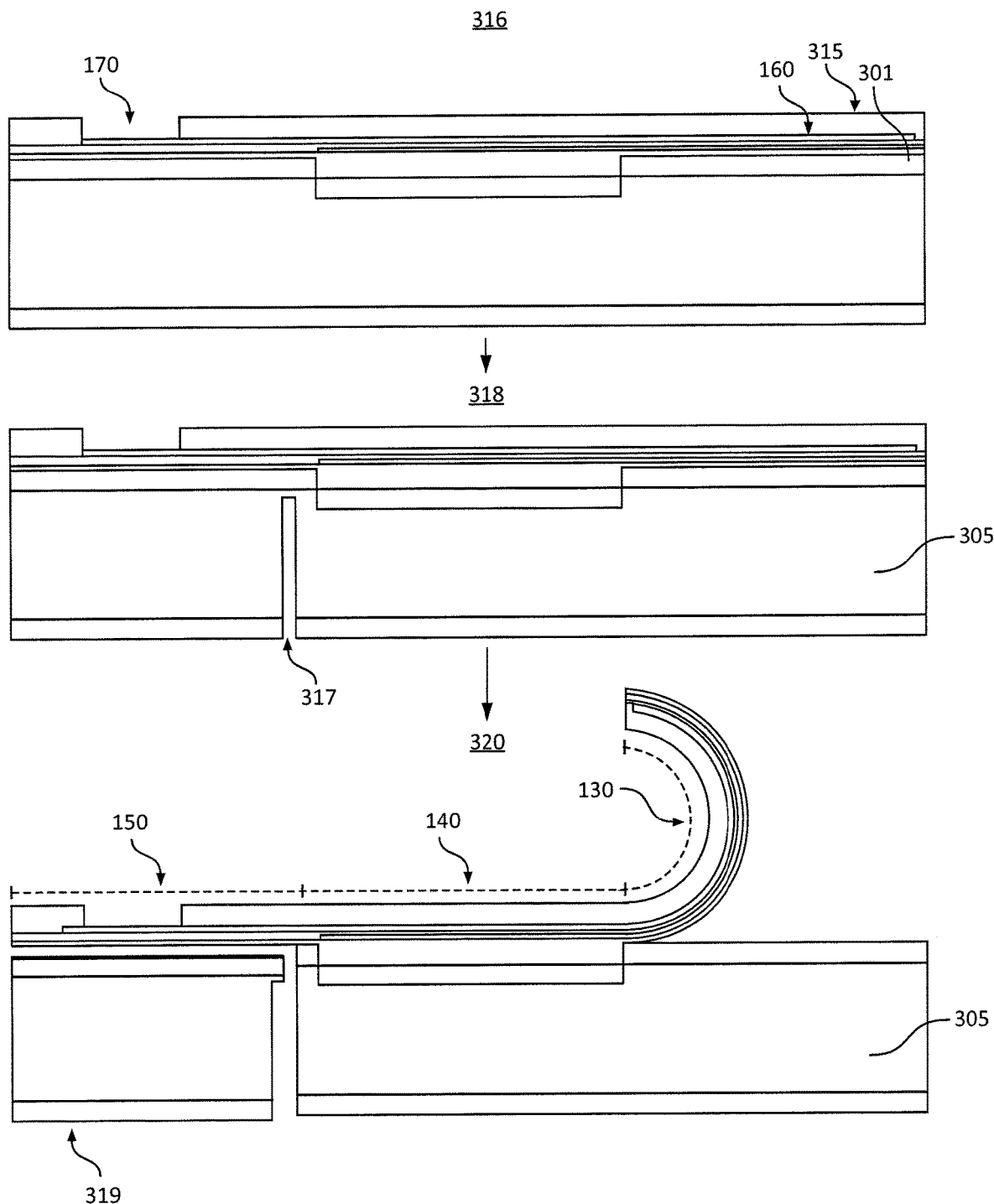

FIG. 3 is a flowchart of exemplary method 300 of manufacturing exemplary flow sensor 100. Method 300 uses the embodiments of sensor 100 in reference to FIG. 1.

At step 302, silicon oxide films, e.g., films 301 and 303, are grown on both sides of silicon wafer 305. According to some embodiments, a wet/dry oxidation furnace facilitates the growth of films 301 and 303. Preferably, the thicknesses of films 301 and 303 are approximately 100 nm.

At step 304, adhesive region 305 is opened on upper film 301. According to some embodiments, regular lithography opens adhesive region 305. According to other embodiments, silicon dioxide etching opens adhesive region 305. For example, silicon dioxide etching may include the use of buffered oxide etch solution.

At step 306, adhesive region 305 receives a treatment of porous silicon, forming layer 307. Preferably, the thickness of layer 307 is between 100 nm and 200 nm. According to some embodiments, the treatment may comprise electro-chemical anodization of porous silicon. According to other embodiments, the treatment may comprise stain etching of porous silicon. According to other embodiments, the treatment may comprise metal-assisted etching of porous silicon.

According to other embodiments, the treatment may comprise colloidal nanoparticle assisted etching of porous silicon.

At step 308, upper film 301 receives a spin coating of polyimide, forming first polyimide layer 309. According to some embodiments, first polyimide layer 309 may form pores in porous silicon layer 307. As a result, first polyimide layer 309 may form a mechanical interlock bonding with porous silicon layer 307. Preferably, the thickness of first polyimide layer 309 is approximately 500 nm.

At step 310, first polyimide layer 309 receives a coating of metal, forming metal layer 311. Preferably, metal layer 311 covers self-rolled portion 130 and stationary portion 140 of sensor 100 and does not cover free ribbon portion 150 of sensor 100. Even more preferably, metal layer 311 includes a metal with a high elastic modulus. For example, metal layer 311 may include chromium, tungsten, etc.

At step 312, upper film 301 receives a spin coating of polyimide, forming second polyimide layer 313. Preferably, second polyimide layer 313 covers metal layer 311. As a result, metal layer 311 may be electrically insulated.

At step 314, upper film 301 receives a coating including strain gauge circuit 160. According to some embodiments, circuit 160 is fabricated using a lift-off process. Preferably, circuit 160 comprises a quarter Wheatstone bridge. Even more preferably, circuit 160 includes a material with high strain sensitivity, for example, platinum or constantan.

At step 316, upper film 301 receives a spin coating of polyimide, forming third polyimide layer 315. Preferably, third polyimide layer 315 covers circuit 160. Even more preferably, the thickness of third polyimide layer 315 is between 3000 nm and 3500 nm. In some embodiments, third polyimide layer 315 may be patterned to one or more contact pads, e.g., pad 170.

First polyimide layer 309, metal layer 311, second polyimide layer 313, circuit 160, and third polyimide layer 315 may comprise the layers of sensor 100. For example, the portion of first polyimide layer 309, metal layer 311, second polyimide layer 313, circuit 160, and third polyimide layer 315 residing over adhesive region 305 may comprise stationary portion 140 of sensor 100. Similarly, the remaining portion of first polyimide layer 309, metal layer 311, second polyimide layer 313, circuit 160, and third polyimide layer 315 may comprise self-rolled portion 130 of sensor 100. The layered portion excluding metal layer 311 may comprise free ribbon portion 150 of sensor 100.

According to some embodiments, first polyimide layer 309 and second polyimide layer 313 may be configured to be as thin as possible. As a result, first polyimide layer 309 and second polyimide layer 313 insulate metal layer 311 without contributing significantly to the resting curvature of self-rolled portion 130.

According to some embodiments, adjusting the thicknesses of metal layer 311 and third polyimide layer 315 may control the resting curvature of self-rolled portion 130. As a result, the sensitivity of self-rolled portion 130 may be configured using the thickness of metal layer 311 and third polyimide layer 315. For example, self-rolled portion 130 may be configured for higher sensitivity at lower external flow speeds or for higher sensitivity at higher external flow speeds.

At step 318, wafer 305 is diced and separated into a plurality of dies. Preferably, each die receives a notch, e.g., notch 317. Even more preferably, each notch, e.g., notch 317, has a thickness between 100 μm and 150 μm.

At step 320, free ribbon portion 150 releases from wafer 305. Preferably, cleaving supporting portion 319 from its corresponding die releases free ribbon portion 150. According to some embodiments, a blade releases self-rolled portion 130 from wafer 305. According to other embodiments, self-rolled portion 130 self-releases from wafer 305 after immersion in a room-temperature liquid. The remaining portion of wafer 305 may comprise substrate 120 of sensor 100.

Exemplary method 300 may include additional steps. For example, method 300 may include heat curing first polyimide layer 309 after spin coating first polyimide layer 309. Preferably, first polyimide layer 309 undergoes heat curing at a temperature of approximately 350° C. and for a duration of approximately two hours.

Similarly, method 300 may include heat curing second polyimide layer 313. Preferably, second polyimide layer 313 undergoes heat curing at a temperature of approximately 350° C. and for a duration of approximately two hours.

Furthermore, in some embodiments, method 300 may include patterning first polyimide layer 309 before heat curing first polyimide layer 309. Preferably, regular lithography is used to pattern first polyimide layer 309.

Similarly, method 300 may include patterning metal layer 311 before spin coating second polyimide layer 313. Preferably, regular lithography is used to pattern metal layer 311.

Similarly, method 300 may include patterning second polyimide layer 313 before heat curing second polyimide layer 313. Preferably, regular lithography is used to pattern second polyimide layer 313. Even more preferably, second polyimide layer 313 is patterned to cover first polyimide layer 309.

Furthermore, method 300 may further include patterning third polyimide layer 315 before dicing wafer 305. Preferably, regular lithography is used to pattern third polyimide layer 315. Even more preferably, third polyimide layer 315 is patterned to open contact pads 170a, 170b, and 170c.

Figure 4A:
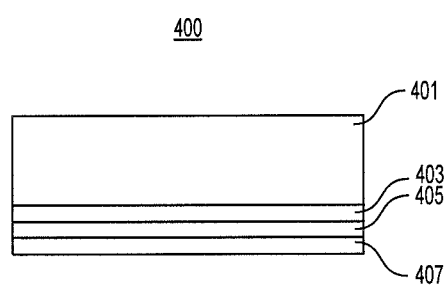
FIG. 4a is a schematic representation of an exemplary layering of the self-rolled portion of the exemplary flow sensor of FIG. 1, according to the present disclosure.

FIG. 4a is a schematic representation of exemplary layering 400 of self-rolled portion 130 of exemplary flow sensor 100 of FIG. 1. Layering 400 may include thick polyimide layer 401 atop second thin polyimide layer 403. Layering 400 may further include metal layer 405 below second thin polyimide layer 403 and first thin polyimide layer 407 below metal layer 405. According to some embodiments, the Young's modulus of the polyimide may be less than that of the metal. As a result, layering 400 may self-roll in an upwards direction.

Figure 4B:
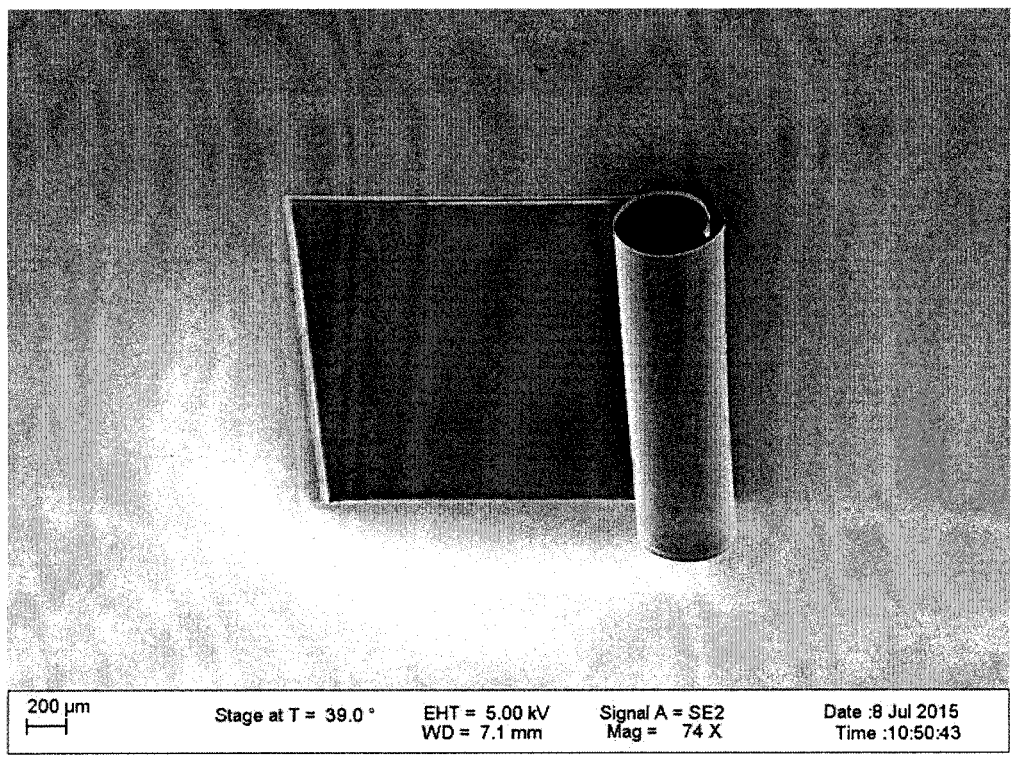
FIG. 4b is a graphical representation of the exemplary layering of FIG. 4a, according to the present disclosure.

FIG. 4b is a graphical representation of exemplary layering 400 of FIG. 4a. As show in FIG. 4b, the self-rolled portion of the sensor has released from the substrate and has self-rolled in the upwards direction. FIG. 4b was taken by a scanning electron microscope.

Figure 5A:
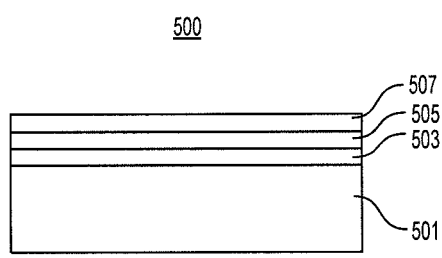
FIG. 5a is a schematic representation of another exemplary layering of the self-rolled portion of the exemplary flow sensor of FIG. 1, according to the present disclosure.

FIG. 5a is a schematic representation of exemplary layering 500 of self-rolled portion 130 of exemplary flow sensor 100 of FIG. 1. Layering 500 may include thick polyimide layer 501 below first thin polyimide layer 503. Layering 500 may further include metal layer 505 atop first thin polyimide layer 503 and second thin polyimide layer 507 atop metal layer 505. According to some embodiments, the Young's modulus of the polyimide may be less than that of the metal. As a result, layering 500 may self-roll in a downwards direction.

Figure 5B:
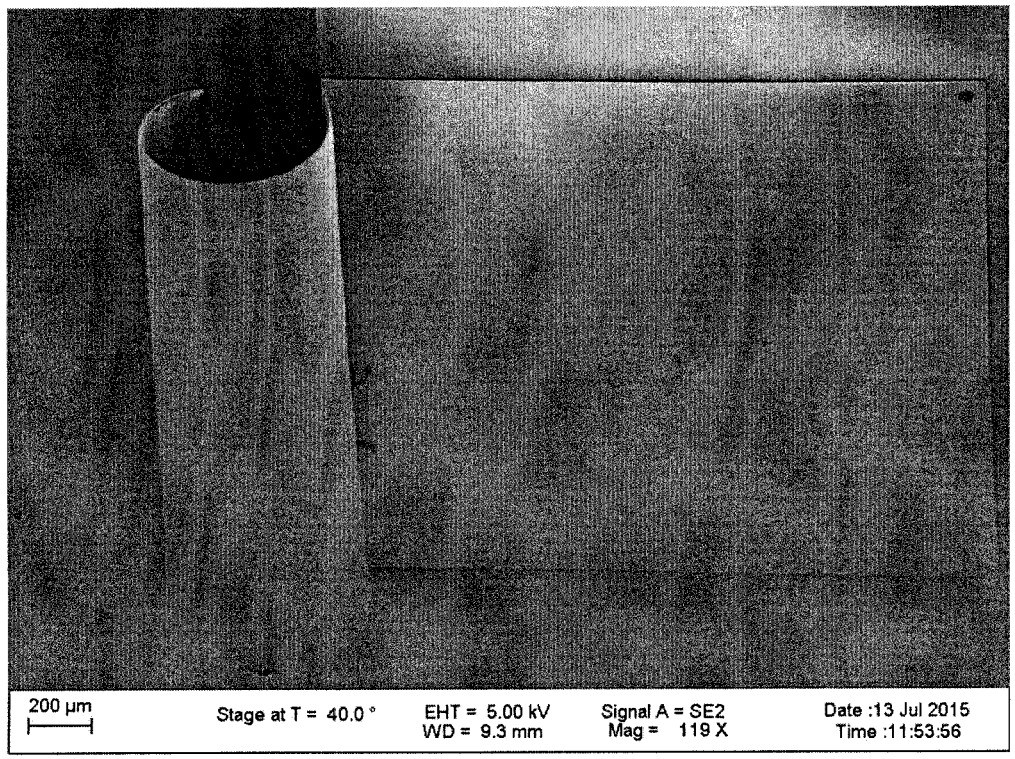
FIG. 5b is a graphical representation of the exemplary layering of FIG. 5a, according to the present disclosure.

FIG. 5b is a graphical representation of exemplary layering 500 of FIG. 5a. As show in FIG. 5b, the self-rolled portion of the sensor has released from the substrate and has self-rolled in the downwards direction. FIG. 5b was taken by a scanning electron microscope.

Other embodiments will be apparent to those skilled in the art from consideration of the specification and practice of the embodiments disclosed herein. It is intended that the specification and examples be considered as exemplary only.

What is claimed is:

1. A superficial flow sensor, comprising:
a thin film comprising a self-rolled portion, a stationary portion, and a free ribbon portion, wherein the self-rolled portion is configured to have a residual stress and to deform under external forces; and
a substrate,
wherein the self-rolled portion comprises:
a first polyimide layer;
a metal layer disposed on the first polyimide layer;
a second polyimide layer disposed on the metal layer;
a sensor layer comprising a strain gauge circuit disposed on the second polyimide layer; and
a third polyimide layer disposed on the sensor layer.

2. The sensor of claim 1, wherein the substrate includes silicon.

3. The sensor of claim 1, further comprising:
at least one contact pad configured to connect to a signal amplifier circuit,
wherein said strain gauge circuit being configured to sense deformation of the self-rolled portion of the thin film.

4. The sensor of claim 3, wherein the output voltage of the strain gauge circuit is linear with respect to an external flow speed.

5. The sensor of claim 1, further comprising:
a layer of porous silicon configured to bond the stationary portion to the substrate; and
a coating of silicon dioxide configured to bond the self-rolled portion to the substrate.

\* \* \* \* \*

UNITED STATES PATENT AND TRADEMARK OFFICE
CERTIFICATE OF CORRECTION

| | |
|---|---|
| PATENT NO. | : 10,782,164 B2 |
| APPLICATION NO. | : 15/774635 |
| DATED | : September 22, 2020 |
| INVENTOR(S) | : Jianzhong Zhu, Hilary Bart-Smith and Carl White |

Page 1 of 1

It is certified that error appears in the above-identified patent and that said Letters Patent is hereby corrected as shown below:

In the Specification

Column 1, after Line 12: Insert the following as a new paragraph:
--This invention was made with government support under N00014-14-1-0533 awarded by the Office of Naval Research. The government has certain rights in the invention.--

Signed and Sealed this
Thirteenth Day of January, 2026

John A. Squires
*Director of the United States Patent and Trademark Office*